(12) United States Patent
Huang

(10) Patent No.: US 6,298,744 B1
(45) Date of Patent: Oct. 9, 2001

(54) BRAKE LEVER STRUCTURE FOR THE SYNCHRONIZED CONTROL OF FRONT AND REAR WHEEL BRAKES

(76) Inventor: Han-Chen Huang, No. 20, Alley 12, Lane 117, Shi Bei Street, Hua Tan Hsiang, Chang Hua Hsien (TW)

(*) Notice: Subject to any disclaimer, the term of this patent is extended or adjusted under 35 U.S.C. 154(b) by 0 days.

(21) Appl. No.: 09/531,757

(22) Filed: Mar. 20, 2000

(30) Foreign Application Priority Data

Jul. 16, 1999 (TW) .......................................... 86210399A01

(51) Int. Cl.[7] ................................................ B62K 23/06
(52) U.S. Cl. ............................................. 74/502.2; 74/489
(58) Field of Search ............................ 74/502.2, 473.14, 74/489

(56) References Cited

U.S. PATENT DOCUMENTS

| | | | |
|---|---|---|---|
| 4,279,174 | * | 7/1981 | Ross ........................................ 74/489 |
| 4,644,816 | * | 2/1987 | Cockburn ................................ 74/489 |
| 4,785,683 | * | 11/1988 | Buckley et al. ........................ 74/489 |
| 4,850,241 | * | 7/1989 | Buckley et al. ........................ 74/489 |
| 4,914,971 | * | 4/1990 | Hinkens et al. ........................ 74/489 |
| 5,669,268 | * | 9/1997 | Tsai ....................................... 74/502.2 |
| 5,778,729 | * | 7/1998 | Tsai ....................................... 74/502.2 |
| 5,845,539 | * | 12/1998 | Huang .................................... 74/489 |
| 6,085,611 | * | 7/2000 | Valdez ................................... 74/502.2 |
| 6,164,153 | * | 12/2000 | Scura ..................................... 74/489 |

* cited by examiner

Primary Examiner—David A. Bucci
Assistant Examiner—Chong H. Kim
(74) Attorney, Agent, or Firm—Dougherty & Troxell

(57) ABSTRACT

A brake lever structure for the synchronized control of front and rear wheel brakes comprised of a braking structure that maintains an equalized braking force to the front and rear wheel which is installed between a brake lever and a brake lever mount and thereby provides even more positive front and rear wheel braking actuation. The braking structure consists of a coupling element extending from an end of the brake lever as well as a linkage component that is movably conjoined to the coupling element and, furthermore, consists of a link rod having pull rods movably conjoined to each of its two ends. A stop rib protrudes from the top end of the rear guide hole of the brake lever mount such that the rear brake pull rod becomes engaged onto the stop rib during brake application and, furthermore, fixes the angle of the brake lever and the link rod, which is a structurally innovative feature of the present invention. When a vehicle equipped with the invention herein is ridden, if any one of the two brake cables become severed, the cable remaining intact is still capable of effectively actuating either the front wheel brake or the rear wheel brake. As such, when the brake lever actuates the linkage component, the two pull rods drawing back the cables traveling in parallel within the two guide holes of the brake lever mount are not only capable of maintaining the synchronized application of the front and rear wheel brakes and at an equalized force, but also of ensured braking capacity when one of the two brake cables is no longer intact to enhance braking stability and performance and thereby provide greater safety.

1 Claim, 5 Drawing Sheets

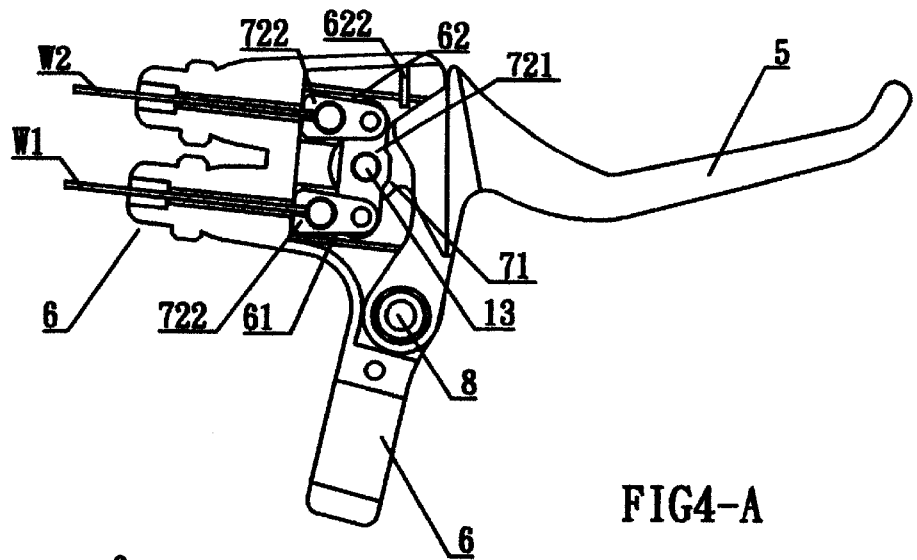
FIG4-A
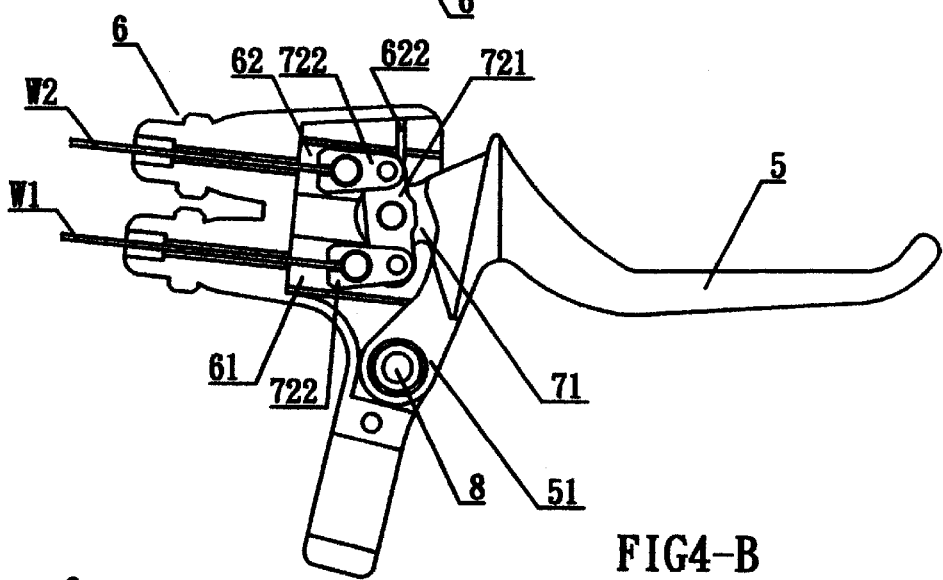
FIG4-B
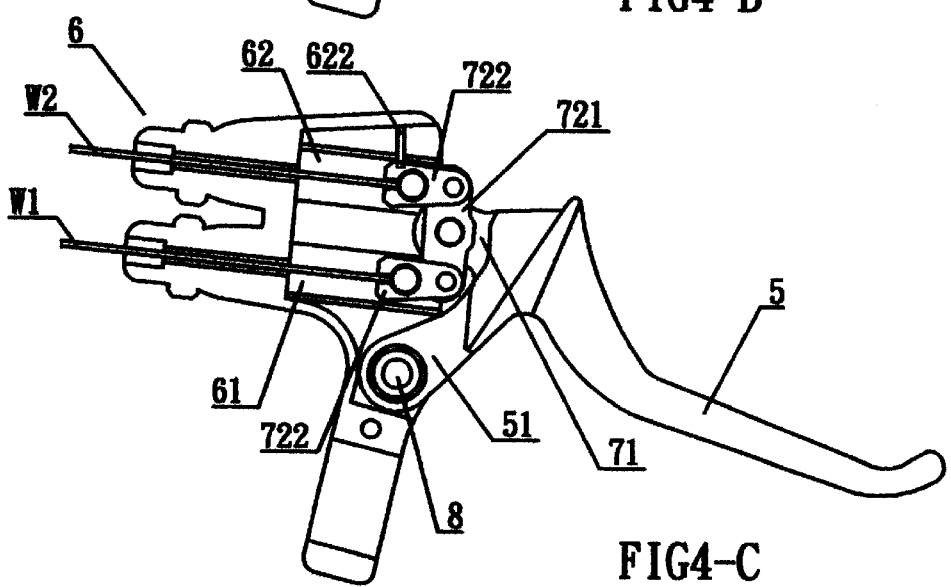
FIG4-C

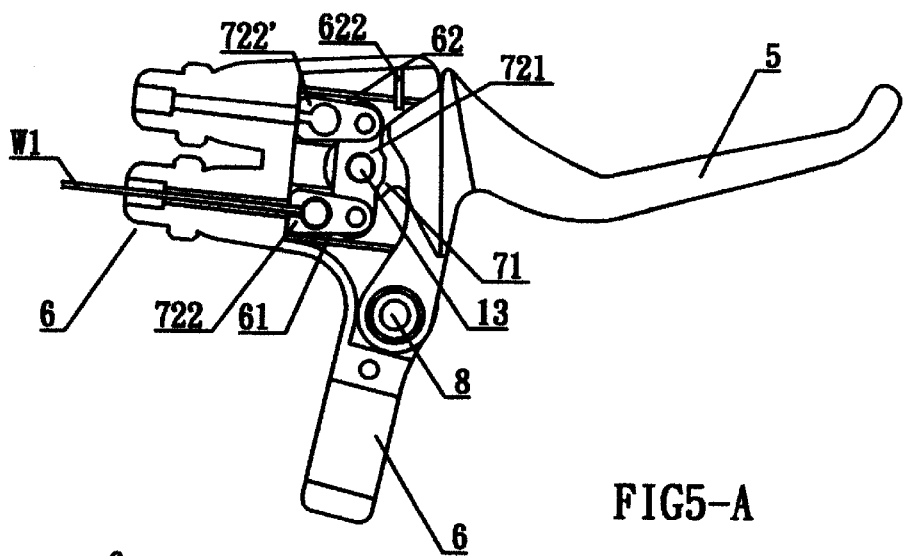
FIG5-A
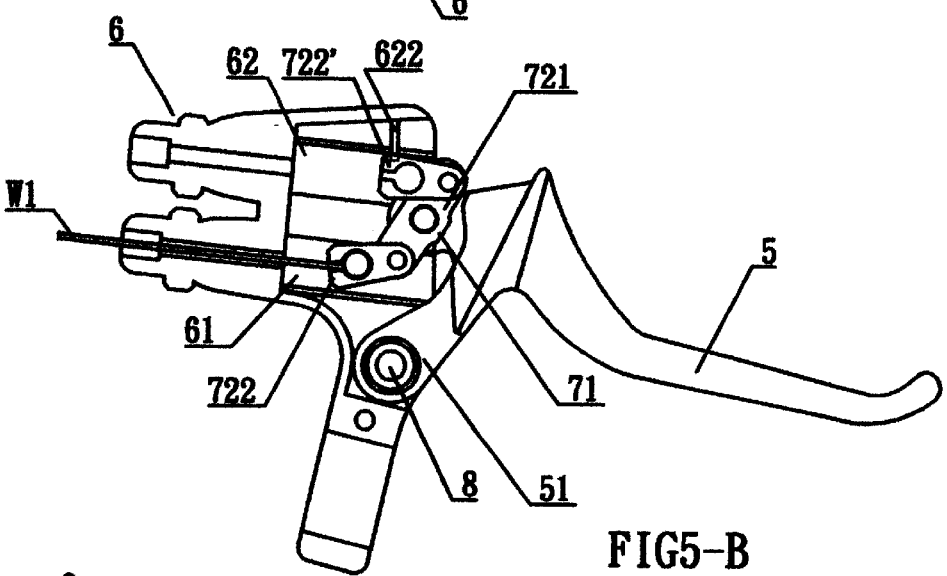
FIG5-B
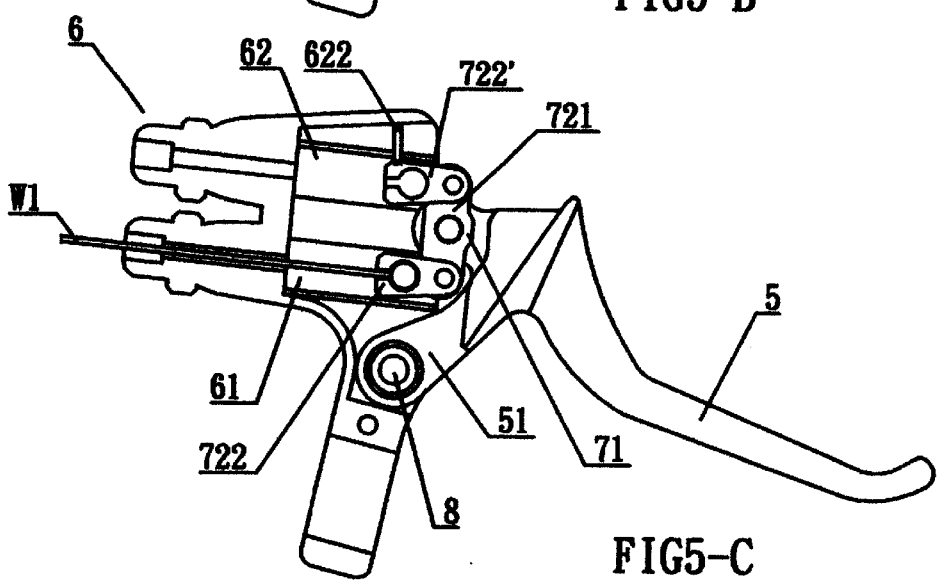
FIG5-C

BRAKE LEVER STRUCTURE FOR THE SYNCHRONIZED CONTROL OF FRONT AND REAR WHEEL BRAKES

BACKGROUND OF THE INVENTION

1) Field of the Invention

The invention herein relates to a brake lever structure for the synchronized control of front and rear wheel brakes comprised of a braking structure installed between a brake lever and a brake lever mount and, furthermore, the braking structure is capable, when the brake lever pulls the linkage component, of simultaneously actuating pull rods movably conjoined to the two sides of the linkage component which are drawn back and travel in parallel towards the guide holes of the brake lever mount; furthermore, when a vehicle equipped with the invention herein is ridden, if any of the two brake cables become severed, the cable remaining intact is still capable of effectively actuating either the front wheel brake or the rear wheel brake and as such, the braking structure is not only capable of maintaining the synchronized application of the front and rear wheel brakes and at an equalized force, but also of ensured braking capacity even when a brake cable is no longer intact to enhance braking stability and performance and thereby provide greater safety.

2) Description of the Prior Art

A conventional brake lever for synchronized front and rear wheel braking such as the type introduced under U.S. Pat. No. 5,845,539 and indicated in FIG. 1 and FIG. 2 is comprised of a brake lever 1 on a motorcycle or bicycle and, furthermore, the said brake lever 1 is installed to a brake lever mount 2; wherein, front and rear guide holes 211 and 212 are formed at the front end of the said brake lever mount 2 to provide for the insertion of a front and a rear brake cable W1 and W2; front and rear slots 2111 and 2121 are respectively formed at the upper ends of the front and rear guide holes 211 and 212, and a hidden slot 22 is formed at the rear end of the said brake lever mount 2; a linkage slot 11 is formed at the cable pulling position of the brake lever 1 and, furthermore, a figure-8 shaped link plate 12 is movably conjoined to a pull rod 14 and inserted into the linkage slot 11, when the front and rear wheel brake cables W1 and W2 are drawn simultaneously for brake application and, furthermore, utilizing the seesawing motion of the pull rod 14 as well as the unique ascending and descending movement capability of the figure-8 shaped link plate 12, if the front and rear wheel braking action is imbalanced or the front and rear wheel brake cables W1 and W2 become slightly slackened, correction by the pull rod 14 and the figure-8 shaped link plate 12 enable a simultaneous braking action at the front and rear wheels; however, in actual utilization, the structure of the said brake lever 1 is inadequate in terms of performance and can be further refined and improved, with the general shortcomings summarized below.

1. Although the conventional braking structure consists of a figure-8 shaped link plate 12 movably conjoined onto the pull rod 14 and is capable of providing, by means of the seesawing motion of the pull rod 14, for the correction and maintaining of synchronized braking by the front and rear wheel brakes, when the said braking structure is in the process of brake actuation, since the pull rod 14 sways to the left and right in a seesawing state during braking, while capable of synchronizing front and rear wheel brake application, the front and rear brake cables W1 and W2 are not drawn upon equally, with the resulting shortcoming being an imbalanced application at the front and rear brakes that causes the sudden stopping of the vehicle and a subsequent leaning over that adversely affects riding safety.

2. Since the conventional braking structure achieves correction by means of the pull rod 14 and the figure-8 shaped link plate 12, when one of the brake cables are severed, the brake lever 1 can only draw back the pull rod 14 no longer connected to a brake cable (the pull rod 14 without braking capability) such that when the brake lever 1 is pressed down once again, the pull rod 14 still connected to a brake cable actuates brake application, but the limited pulling distance of the brake cable precludes the attainment of effective braking performance, which results in compromised riding safety.

Therefore, the inventor of the invention herein conducted extensive research and design efforts to improve the conventional product which, following numerous testing and refinement, culminated in the successful development of a brake lever structure for the synchronized control of front and rear wheel brakes of the present invention that completely eliminates the shortcomings of the prior art and, furthermore, offers significantly increased practical performance.

SUMMARY OF THE INVENTION

The primary objective of the invention herein is to provide a brake lever structure capable of maintaining synchronized braking and at an equalized braking force comprised of a braking structure installed between the brake lever and the brake lever mount and, furthermore, consists of a coupling element extending from the end of the brake lever and a linkage component that is movably conjoined to the coupling element, with a bolt inserted to assemble the brake lever to the brake lever mount; a front and a rear wheel brake cable are respectively inserted into a front and a rear guide hole of the brake lever mount and then inserted and secured into the pull rods of the linkage component; when the brake lever pulls the linkage component of the braking structure, each of the pull rods at the two sides of the linkage component draw back the two cables which travel together in parallel within the front and rear guide holes of the brake lever mount and as such, the braking structure is not only capable of maintaining the synchronized application of the front and rear wheel brakes and at an equalized force, but also of ensured braking capacity, enhancing braking stability and performance and thereby providing greater safety.

Another objective of the invention herein is to provide a brake lever structure capable of ensured braking capacity even when one of the two brake cables is severed that is comprised of a braking structure installed between the brake lever and the brake lever mount and, furthermore, a structurally innovative stop rib protruding from the top end of the rear guide hole of the brake lever mount such that if the rear brake cable is severed, since the pull rod of the rear brake braking structure becomes engaged against the stop rib, the angle of the brake lever and the link rod is thereby fixed, allowing the pulling of the front brake cable to achieve braking application; as such, since the brake lever is capable of drawing back the pull rod still connected to the unsevered cable to actuate braking action, positive braking performance and safety is ensured even if one of the two brake cables is no longer intact.

To enable a further understanding of the technological means, functions, and objectives of the present invention, the brief description of the drawings below is followed by the detailed description of the invention herein.

BRIEF DESCRIPTION OF THE DRAWINGS

FIG. 2-A is a cross-sectional drawing of a conventional brake lever structure after brake actuation.

FIG. 4-A is a cross-sectional drawing of the invention herein before brake actuation under normal conditions.

FIG. 4-B is a cross-sectional drawing of the invention herein during brake actuation under normal conditions.

FIG. 4-C is a cross-sectional drawing of the invention herein after brake actuation under normal conditions.

FIG. 5-A is a cross-sectional drawing of the invention herein before brake actuation when one of the two brake cables is severed.

FIG. 5-B is a cross-sectional drawing of the invention herein during brake actuation when one of the two brake cables is severed.

FIG. 5-C is a cross-sectional drawing of the invention herein after brake actuation when one of the two brake cables is severed.

DETAILED DESCRIPTION OF THE INVENTION

Figure 1:
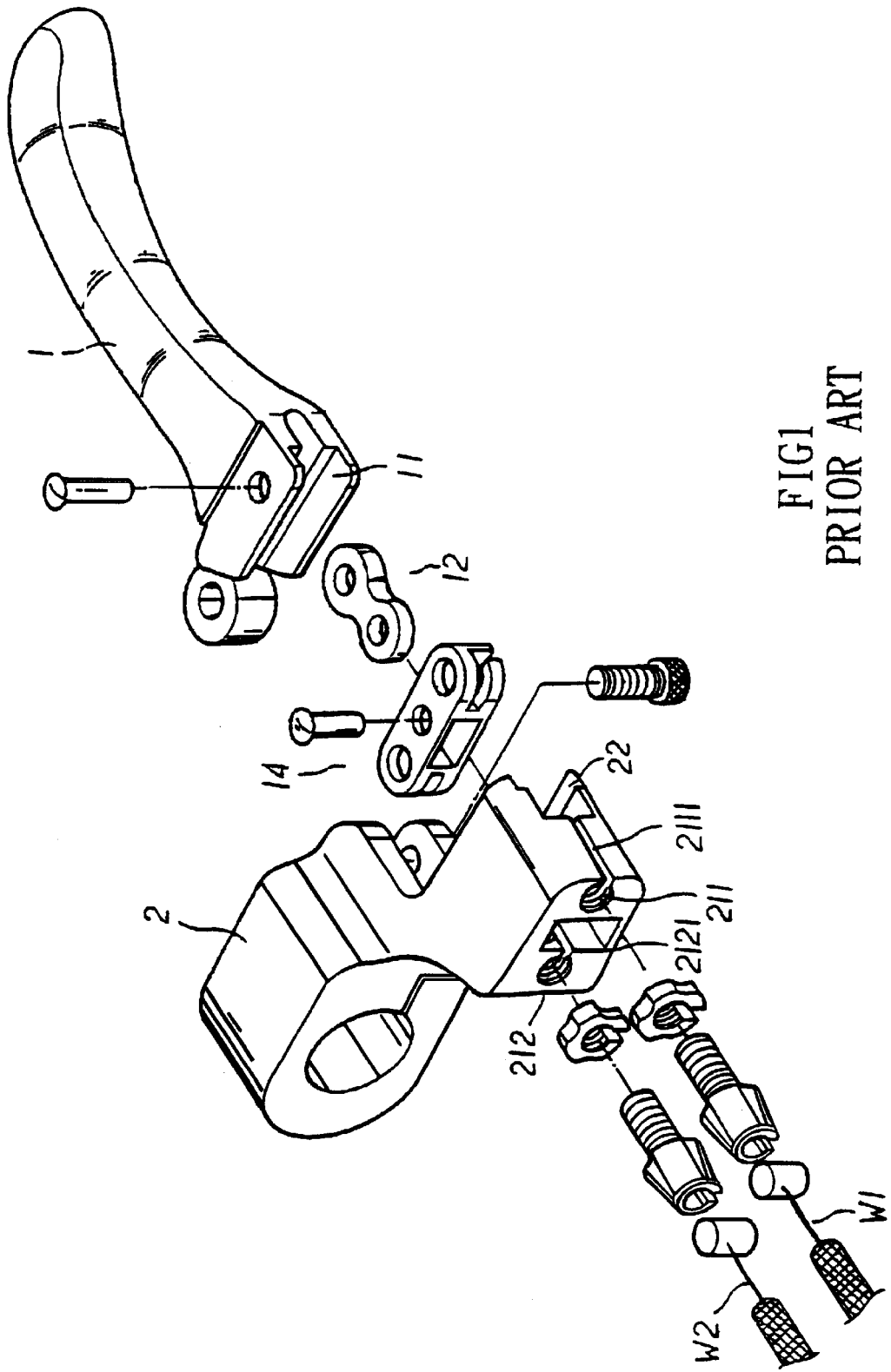
FIG. 1 is an isometric drawing of a conventional brake lever structure.
Figure 2:
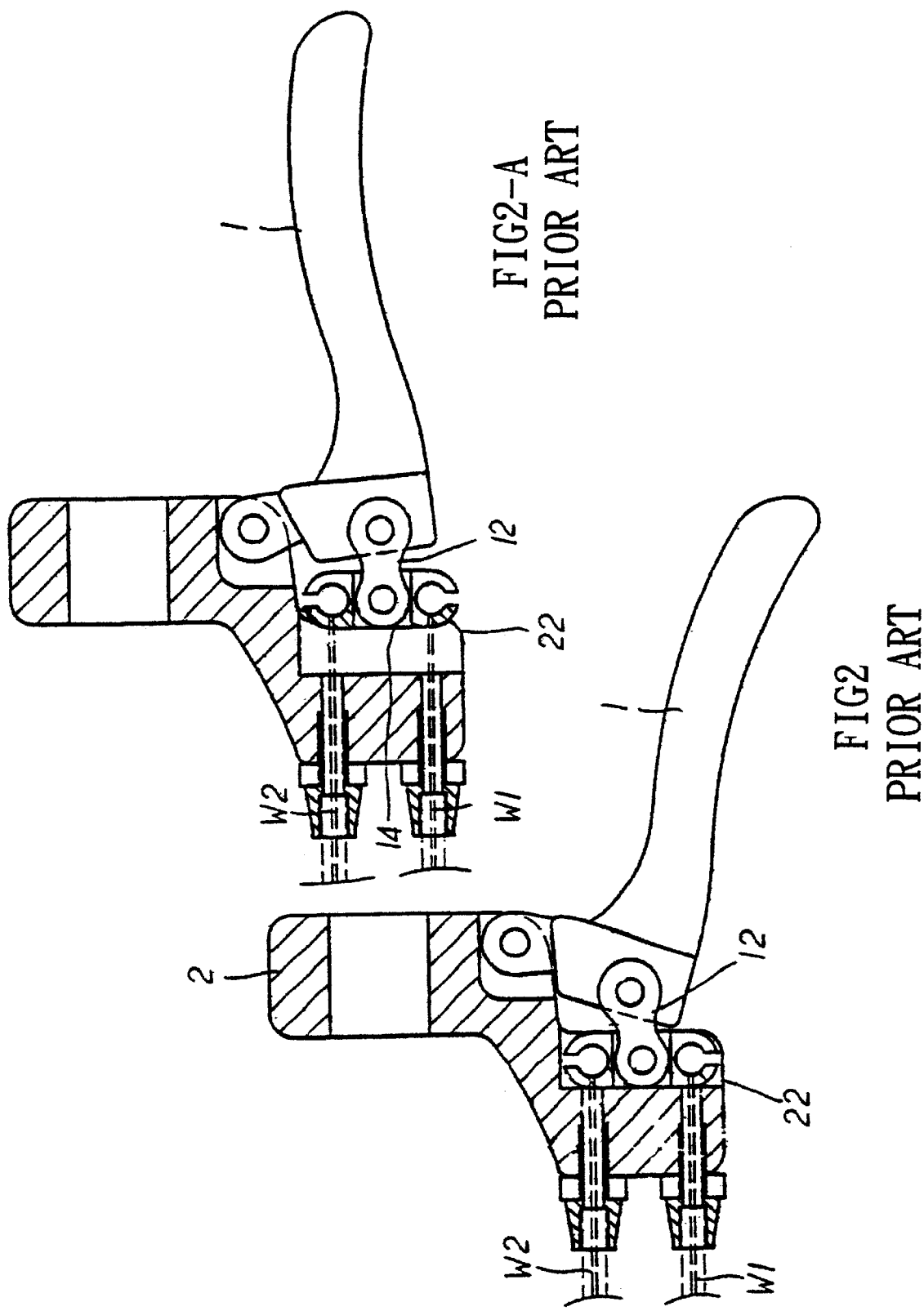
FIG. 2 is a cross-sectional drawing of a conventional brake lever structure before brake actuation.
Figure 3:
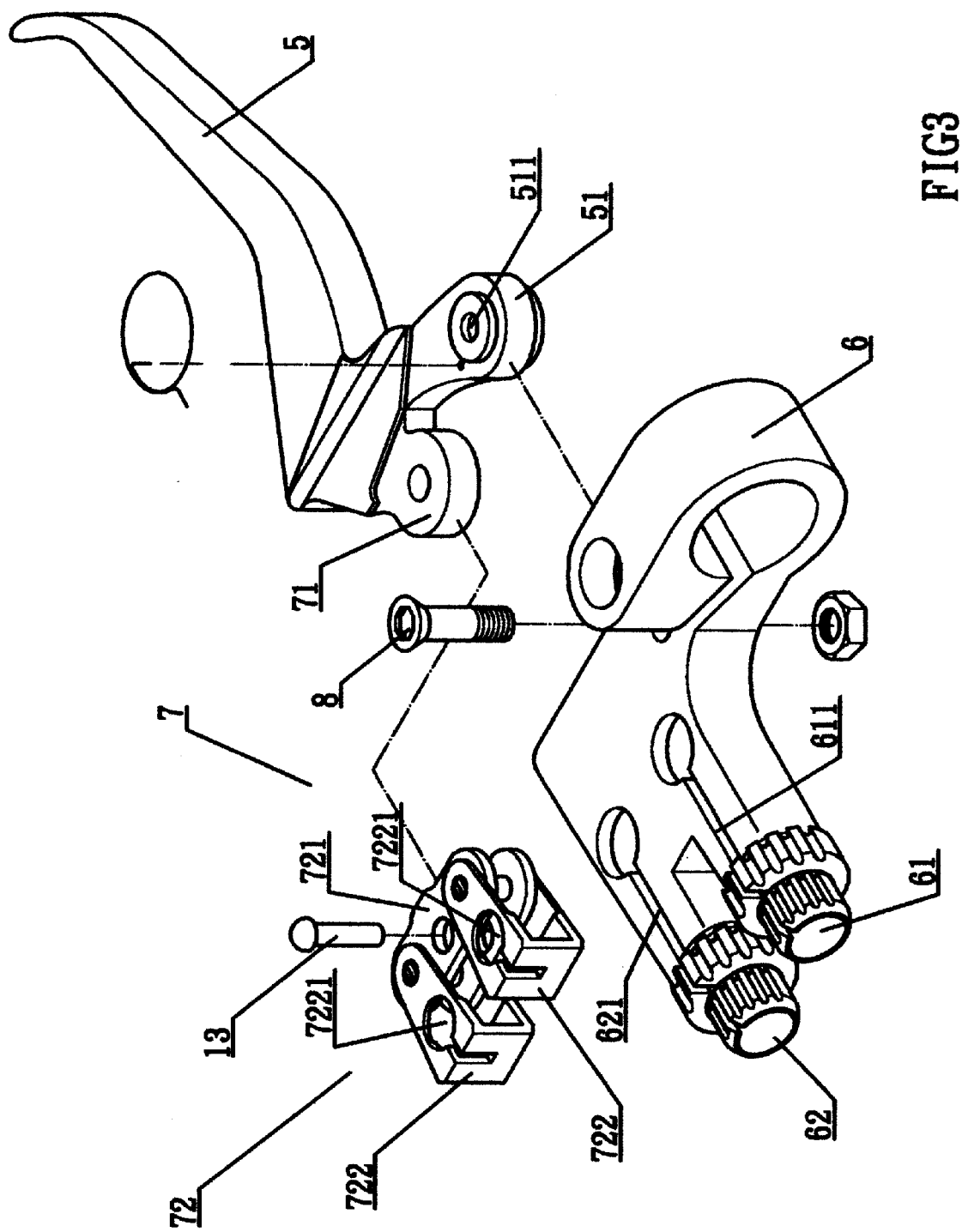
FIG. 3 is an exploded drawing of the invention herein.

Referring to FIG. 3, the brake lever structure for the synchronized control of front and rear wheel brakes of the invention herein is comprised of a braking structure 7 that maintains an equalized braking force to the front and rear wheel which is installed between a brake lever 5 and a brake lever mount 6 and, furthermore, a bolt 8 that is inserted through the brake lever mount 6 and a pivot hole 511 in the brake lever 5 to assemble the brake lever 5 to the brake lever mount 6.

A fulcrum element 51 projects from a side of the said brake lever 5 and, furthermore, the said fulcrum element 51 provides for the insertion of the bolt 8 through the pivot hole 511 of brake lever 5 to achieve a movable arrangement between the brake lever mount 6 and the brake lever 5; with the said arrangement thereby affording control over the brakes installed on the wheels to achieve braking performance on a motorcycle or a bicycle.

Front and rear guide holes 61 and 62 at the forward end of the said brake lever mount 6 provide for the respective insertion of the two cables W1 and W2 and, furthermore, contiguous front and rear slots 611 and 621 are formed at the respective anterior aspects of the said guide holes 61 and 62.

The innovative features are that the said braking structure 7 consists of a coupling element 71 extending from the end of the brake lever 5 and a linkage component 72 which is movably conjoined to the coupling element 71; the said linkage component 72 is movably conjoined to the coupling element 71 by a rivet 13 inserted through a link rod 721, with the link rod 721 having a swiveling appendage on each of its two ends and, furthermore, that are fixed in position within the front and rear guide holes 61 and 62 of the brake lever mount 6, and pull rods 722 that draw the brake cables W1 and W2; furthermore, the front and rear wheel brake cables W1 and W2 are respectively inserted into the front and rear guide holes 61 and 62 of the brake lever mount 6, with the ends inserted and secured in the pull rods 722 of the linkage component 72; furthermore, a stop rib 622 protrudes from the top end of the rear guide hole 62 of the brake lever mount 6, such that when one of the two brake cables W1 and W2 is severed, the rear brake pull rod 722 becomes engaged against the stop rib 622.

Referring to FIG. 4-A, FIG. 4-B, and FIG. 4-C, during the braking actuation sequence of the invention herein, the front and rear wheel brake cables W1 and W2 are situated in the front guide hole 61 and the rear guide hole 62, respectively, with the brake cables also respectively secured in the fitting holes 7221 of the pull rods 722 at the two sides of the linkage component 72; during the pre-brake actuation phase shown in FIG. 4-A, when the brake lever 5 pulls the linkage component 72 of the braking structure 7, each of the pull rods 722 at the two sides of the linkage component 72 draw back the cables W1 and W2 which travel together in parallel within the front and rear guide holes 211 and 221 of the brake lever mount 6, with the balanced actuation by the front and rear wheel brake cables W1 and W2 (as shown in FIG. 4-B and FIG. 4-C) capable of maintaining a synchronized braking action and at an equalized force to ensure riding safety.

When one of the two brake cables W1 and W2 are severed (for example, the front brake cable W1), the brake lever 5 immediately pulls the rear brake cable W2 connected to the pull rod 722 and actuates the rear wheel brake; referring to FIG. 5-A, FIG. 5-B, and FIG. 5-C, in the braking actuation sequence when the rear brake cable W2 is severed, during brake application, since the brake lever 5 first draws back the pull rod 722' no longer connected to the brake cable until the pull rod 722' becomes engaged on the stop rib 622, which fixes the angle of the brake lever 5 and the link rod 721 (as shown in FIG. 5-B), this enables the front brake cable W1 still connected to the pull rod 722 to be drawn rearward to apply the front brake and thereby compensate for braking distance losses (as shown in FIG. 5-C) when the rear brake cable W2 is no longer intact; as such, when the brake lever 5 actuates the linkage component 72, the pull rods 722' and 722 that draw back the cables which travel in parallel within the guide holes 62 and 61 of the brake lever mount 6 are not only capable of maintaining the synchronized application of the front and rear wheel brakes and at an equalized force, but also of ensured braking capacity when one of the two brake cables W1 and W2 is no longer intact to enhance braking stability and performance and thereby provide greater safety.

When a vehicle equipped with the invention herein is ridden, if any one of the two brake cables (W1 or W2) become severed, the cable remaining intact is still capable of actuating either the front wheel brake or the rear wheel brake to ensure riding safety.

In summation of the foregoing section, since the innovative structure of the invention herein is fully capable of achieving its original objectives and provides significantly more practical performance than the conventional product and, furthermore, no product of identical structural innovation has been publicly marketed, the present invention complies with new patent application requirements and is hereby lawfully submitted for review and the granting of the commensurate patent rights to further encourage the spirit of innovation as provided for under the patent law.

What is claimed is:

1. A brake lever structure for the synchronized control of front and rear wheel brakes comprised of a braking structure that maintains an equalized braking force to the front and rear wheel which is installed between a brake lever and a brake lever mount and, furthermore, a bolt that is inserted through said brake lever mount and a pivot hole in said brake lever to assemble said brake lever to said brake lever mount as well as two brake cables that are inserted into two respective guide holes, with the ends of the brake cables inserted and secured in two pull rods of a linkage component; said braking structure consists of a coupling element extending from an end of said brake lever and, said linkage component which is movably conjoined to said coupling element; wherein said linkage component is movably conjoined to said coupling element by a pin inserted through a link rod, with said link rod having a swiveling appendage on each of its two ends, wherein said linkage component is fixed in position within a rear guide hole of said brake lever mount, with said two pull rods drawing said two brake cables; and wherein a stop rib protrudes from the top end of a rear guide hole of the said brake lever mount, such that during braking, said one of pull of rods said braking structure becomes engaged onto said stop rib.

* * * * *